(12) United States Patent
Poncelet et al.

(10) Patent No.: US 7,309,742 B2
(45) Date of Patent: Dec. 18, 2007

(54) IMPACT COPOLYMER WITH OPTIMIZED MELT FLOW, STIFFNESS, AND LOW-TEMPERATURE IMPACT RESISTANCE

(75) Inventors: Robert Poncelet, Ottignies (BE); Jerry Murrey, Deer Park, TX (US); Doug Burmaster, Houston, TX (US); Marc Mayhall, Houston, TX (US); Owen Hodges, Friendswood, TX (US)

(73) Assignee: Fina Technology, Inc., Houston, TX (US)

( * ) Notice: Subject to any disclaimer, the term of this patent is extended or adjusted under 35 U.S.C. 154(b) by 438 days.

(21) Appl. No.: 10/714,011

(22) Filed: Nov. 14, 2003

(65) Prior Publication Data

US 2005/0107558 A1 May 19, 2005

(51) Int. Cl.
*C08F 297/00* (2006.01)
*C08F 297/08* (2006.01)

(52) U.S. Cl. ........................ 525/323; 525/387; 525/938

(58) Field of Classification Search ................ 525/323, 525/387, 938
See application file for complete search history.

(56) References Cited

U.S. PATENT DOCUMENTS 6,503,990 B2    1/2003   Kasehagen et al. ......... 525/384
6,803,421 B2 *  10/2004  Joseph ....................... 525/240

FOREIGN PATENT DOCUMENTS

WO        WO 02/20628      *   3/2002

* cited by examiner

*Primary Examiner*—Fred Teskin
(74) *Attorney, Agent, or Firm*—Tenley R. Krueger; Diane L. Kilpatrick-Lee

(57) ABSTRACT

An impact copolymer having a flexural modulus (ASTM D-790) of at least about 1,100 MPa; a melt flow rate (ASTM D-1238) of at least about 15 g/10 min; and a maximum load under Dynatup Impact test (ASTM D-3763) of equal to or greater than about 1,700 N at a temperature of less than or equal to about −40° C. and articles of manufacture from same.

23 Claims, 2 Drawing Sheets

Dynatup Maximum Load at 6 m/s Velocity

Dynatup Maximum Load at 8.5 m/s Velocity

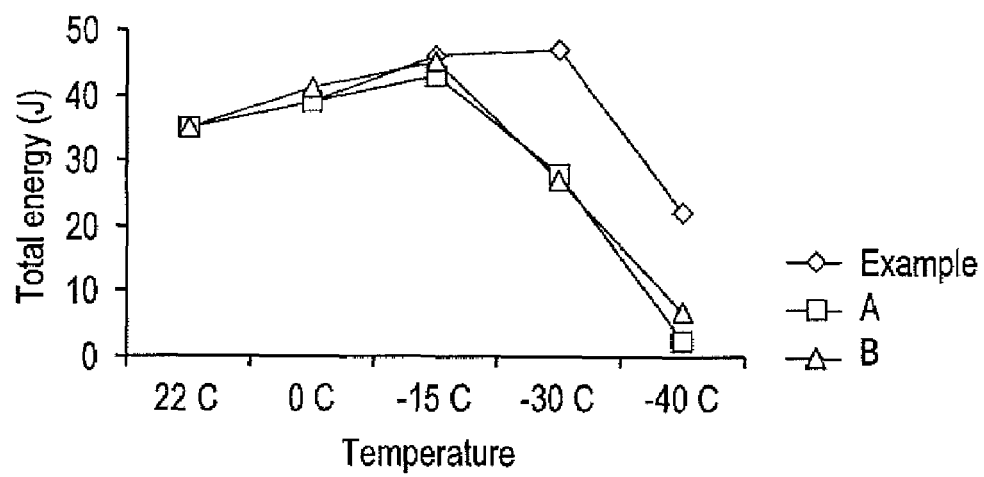
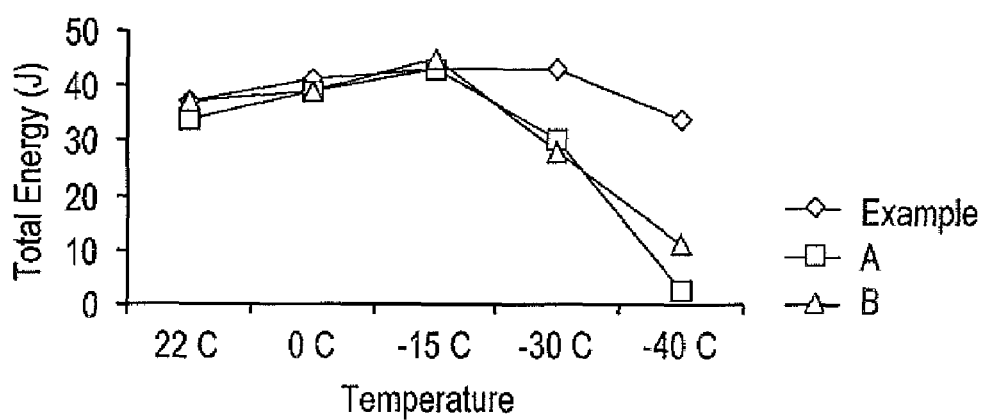

IMPACT COPOLYMER WITH OPTIMIZED MELT FLOW, STIFFNESS, AND LOW-TEMPERATURE IMPACT RESISTANCE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to impact copolymers, and more particularly to ethylene-propylene copolymers.

BACKGROUND OF THE INVENTION

The number of consumer products that contain polymers continues to increase every day. As such, there is a growing need to develop polymers that can be used to form better-suited products for consumers. Industry is concerned with developing specialized polymers for uses that require a unique set of properties. For example, vehicle interiors, such as interior trim components and dashboards, require a combination of rigidity for structural integrity and compressibility for minimizing injury from passenger impact over a temperature range.

To meet such specialized needs, a special class of polypropylene polymers has been developed termed "impact copolymers" (ICP). Impact copolymers may also be referred to as block copolymers or heterophasic copolymers. Polypropylene impact copolymers are useful in applications requiring high impact resistance and high rigidity. Furthermore, polypropylene impact copolymers have the advantage of using common processing methods such as injection molding or extrusion. Nevertheless, there is a continuing demand for more specialized compositions with properties suited to specific applications.

SUMMARY OF THE INVENTION

In an embodiment, an impact copolymer is disclosed comprising the following physical properties: a flexural modulus (ASTM D-790) of at least about 1,100 MPa; a melt flow rate (ASTM D-1238) of at least about 25 g/10 mm; and a maximum load under Dynatup Impact test (ASTM D-3763) of equal to or greater than about 1,700 N at a temperature of greater than or equal to about −40° C.

In an embodiment, an impact copolymer is disclosed comprising the following physical properties: a flexural modulus (ASTM D-790) of at least about 1,100 MPa; a melt flow rate (ASTM D-1238) of at least about 25 g/10 mm; and a total energy absorbed under Dynatup Impact test (ASTM D-3763) of greater than about 28 J at a temperature greater than or equal to about −30° C. at a test velocity of 6 m/s.

In an embodiment, an impact copolymer is disclosed comprising the following physical properties: a flexural modulus (ASTM D-790) of at least about 1,100 MPa; a melt flow rate (ASTM D-1238) of at least about 25 g/10 mm; and a total energy absorbed under Dynatup Impact test (ASTM D-3763) of greater than about 30 J at a temperature greater than or equal to about −30° C. at a test velocity of 8.5 m/s.

DESCRIPTION OF THE DRAWINGS

The invention, together with further advantages thereof, may best be understood by reference to the following description taken in conjunction with the accompanying drawings in which:

FIGS. 3-4 are graphs depicting total energy for samples from a Dynatup Impact test.

DETAILED DESCRIPTION OF THE INVENTION

Figure 1:
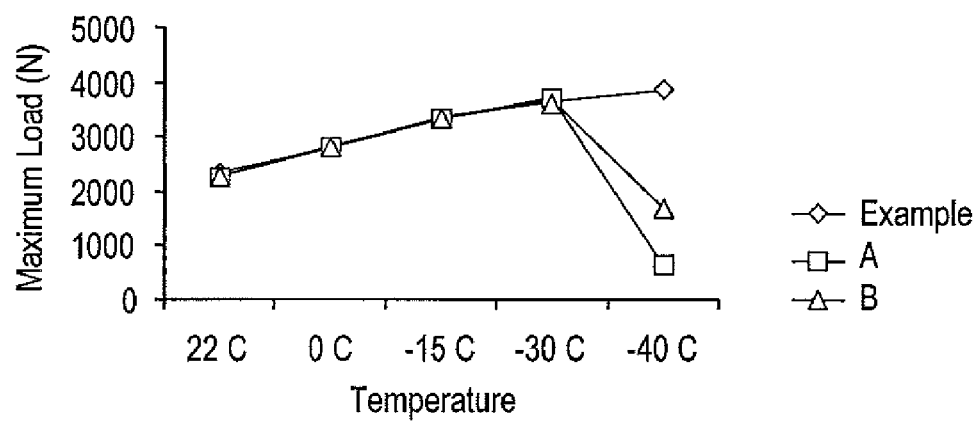
FIGS. 1-2 are graphs depicting maximum load for samples from a Dynatup Impact test.

According to an embodiment of the present invention, a polymer resin comprising a polypropylene impact copolymer (also known as a block copolymer) is disclosed. Polypropylene impact copolymers are a type of block copolymer wherein a polypropylene homopolymer phase or component is joined to a copolymer phase or component. The homopolymer phase of a polypropylene impact copolymer is preferably a propylene homopolymer, provided however that the homopolymer phase may contain up to about 5% by weight of another alpha-olefin, including but not limited, to $C_2$ and $C_4$-$C_8$ alpha-olefins such as 1-butene and ethylene. Despite the potential presence of small amounts of other alpha-olefins, this polymer is generally referred to as a polypropylene homopolymer. The copolymer phase of a polypropylene impact copolymer is typically a block copolymer of propylene and ethylene with propylene as the major constituent and generally containing about 5 to 25% by weight ethylene. The copolymer phase can be referred to as an ethylene/propylene rubber. Small amounts of other polymerizable monomers may be included with the propylene and ethylene if desired.

Polymer resins comprising polypropylene impact copolymers are usually produced in a sequential polymerization process wherein propylene, and possibly up to about 5% by weight of another alpha-olefin, is catalyzed, typically by a Ziegler-Natta catalyst, in a first reactor to produce the polypropylene homopolymer. The polypropylene homopolymer is then discharged into a second reactor where the copolymer is produced by the copolymerization of the propylene and the ethylene in the presence of the polypropylene homopolymer and a catalyst, again typically a Ziegler-Natta catalyst. The copolymer, which has rubbery characteristics and provides impact resistance, is incorporated within the matrix of the homopolymer component, which provides overall stiffness. The polypropylene homopolymer typically makes up about 70 to 85% by weight of the total composition of the polypropylene impact copolymer.

According to an embodiment of the present invention, the polymer resin can be a polypropylene impact copolymer formed according to the above description. The polypropylene homopolymer may be reacted with ethylene and propylene monomers to form a propylene ethylene impact copolymer. For example, the ethylene content of the polymer resin may be between about 3 and about 25% by weight. Alternatively, the ethylene content may be between about 8 and about 15% by weight, or the ethylene content may be between about 10 and about 12% by weight. An example of a suitable propylene ethylene impact copolymer is know as ATOFINA 5720 available from ATOFINA Petrochemicals, Inc. of LaPorte, Tex., a description of which is provided in Table 1.

TABLE 1

| Properties | Typical Value | Test Method |
|---|---|---|
| Melt Flow, g/10 min. | 18 | ASTM D-1238 |
| Density, g/cm$^3$ | 0.905 | ASTM D-1505 |
| Melting Range, ° C. | 160-165 | ATOFINA Method |
| Tensile Strength at Yield, psi (MPa) | 3,200 (22) | ASTM D-638 |
| Elongation at Yield, % | 9 | ASTM D-638 |
| Flexural Modulus, psi (MPa) | 170,000 (1200) | ASTM D-790 |
| Izod Impact (Notched) @ 23° C., ft-lb/in (J/m) | 3.6 (180) | ASTM D-256 |
| Vicat Softening Point, ° C. | 145 | ASTM D-1525 |
| Heat Deflection Temperature, ° C. | 87 | ASTM D-648 |

In an embodiment, the polymer resin may be improved with the addition of various additives. Additives may help improve the thermal stability of the polymer and may provide a nucleation agent for improved crystallinity in the final product. Additives may improve various other properties as well, such as the ease with which the polymer, when injected into a mold, releases the mold. Various additives are potentially useful for accomplishing these objectives. For example, in an embodiment, the polymer resin may be thermally stabilized by the addition of CIBA® IRGANOX® 1010 Tetrakis(methylene3,5-di-(tert)-butyl-4-hydroxyhydrocinnamate)methane and/or CIBA® IRGAFOS® 168 Tris (2,4-di-(tert)-butylphenyl) phosphite. Various nucleation agents, such as talc, may be used. In another embodiment, acid neutralizers such as metallic stearates, alternately calcium stearate, may be used. In certain embodiments, one or any combination of the above additives may be used to produce thermally stable, crystalline polymers.

The addition of stabilization agents, such as IRGANOX® 1010 phenolic antioxidant and IRGAFOS® 168 phosphite, help protect the polymer resin from degradation due to exposure to excessive temperatures. Other phenolic stabilizers may be used such as ETHANOX 330, and other phosphate stabilizers may be used such as ULTRANOX 626. In an embodiment, such additives may be used in polymer resins in concentrations from about 0 to about 2,000 ppm by weight of the polymer resin each. Alternately, such additives may be used in concentrations of about 0 to about 1,000 ppm by weight each. In another alternate embodiment, these additives each may constitute about 500 ppm by weight of the polymer resin.

Metallic stearate additives may aid in the processing of polymer resins by neutralizing acidic sites as well as aiding mold release. Metallic stearates, alternately calcium stearate, may be used in concentrations from about 0 to about 2,000 ppm by weight of the polymer resin. Alternately, such additives may be used in concentrations of about 0 to about 1,000 ppm by weight. In another alternate embodiment, these additives may constitute about 500 ppm by weight of a polymer resin. Alternative neutralizers may be used such as zinc sterate or synthetic hydratalcite.

Nucleation agents may improve crystallinity of a polymer resin by providing starting points for crystallization. Addition of nucleation agents may increase the rate of crystallization and reduce processing times. Several materials may be used as nucleation agents, including but not limited to, talc, various benzoates, phosphates, metallic-silicatehydrates, Amfine Na-11 and Na-21, Milliken HPN-68, and Millad 3988. In an embodiment, nucleation agents may be used in concentrations from about 0 to about 3000 ppm by weight of the polymer resin. In an embodiment, talc is used in an amount up to about 10,000 ppm by weight. Alternately, such agents may be used in concentrations of about 0 to about 1000 ppm by weight. In another alternate embodiment, these additives may constitute about 500 ppm by weight of the polymer resin.

The polymer resin may be further processed if desired to increase melt flow rate, which may be conducted either before or after addition of one or more additives or agents as described above. Melt flow rate (or melt flow index) may be defined by various standards, including ASTM D1238, ASTM D3364, or ISO 1133. Generally, melt flow rate indicates the quantity of a melted polymer resin that will flow through an orifice at a specified temperature and under a specified load. For all purposes disclosed in this application, when melt flow rate is referred to, it constitutes the melt flow rate measured by ASTM D-1238 at 230° C. and under a load of 2.16 kg. For some applications, it may be important to increase melt flow rate to improve polymer resin flow for injection molding or other purposes.

Melt flow rate may be increased by various techniques such as visbreaking. For example, melt flow rate may be increased by the method described in U.S. Pat. No. 6,503,990, which is incorporated by reference in its entirety. As described in that publication, quantities of peroxide are mixed with polymer resin in flake, powder, or pellet form. Such processing produces a modified polymer resin. The polymer resin may contain additional additives and/or agents. In an embodiment, the peroxide material may be mixed with the polymer resin in concentrations of from about 50 to about 10,000 ppm by weight, alternatively from about 50 to about 5,000 ppm by weight. Alternately, the peroxide material may be added to produce concentrations from about 100 to about 2,000 ppm by weight. In an embodiment, all of the components, including polymer resin with, or without additives, and peroxide, may be mixed at room temperature or above and extruded at temperatures not exceeding 550° F. (about 288° C.) to form a modified polymer resin. Alternately, the mixed components may be extruded at temperatures between about 390° F. (about 200° C.) and about 500° F. (about 260° C.). However, there is no requirement that the additives and agents and/or the peroxide be premixed. Although the components may be premixed in a heated mixer, preferably not exceeding about 210° F. (about 100° C.) prior to adding to an extruder, the components may be fed concurrently to an extruder without premixing.

The mixture of components may be processed at a temperature of about 350° F. (about 177°C.) to about 550° F. (about 288° C.) for a time necessary to increase the melt flow rate to the desired rate. The time necessary to achieve the desired modified polymer resin may be readily determined by a few pilot experiments by one of skill in the art. Acceptable peroxides include, but are not limited to, dialkyl peroxides; 4-(t-amylperoxy)-4-methyl-2-pentanol; dihexylene glycol peroxide; t-hexylperoxy)-4-methyl-2-pentanol; 4-(t-octylperoxy)4-methyl-2-pentanol; 2-methyl-2-t-amylperoxy-4-pentanone; di-t-hexyl peroxide; di-t-octyl peroxide; 2,5 dimethyl 2,5-Di-t-butylperoxy hexane, for example commercially available as LUPEROX® 101; the t-amyl, t-hexyl and t-octyl analogs of LUPEROX® 101; mixed dialkyl peroxides such as t-amyl-t-hexyl peroxide and t-amyl-t-octyl peroxide; and mixtures thereof. In an embodiment, LUPEROX® 101 may be used in concentrations of from about 0 to about 1,000 ppm by weight in the polymer resin. Alternately, LUPEROX® 101 may be used in concentrations of from about 50 to about 750 ppm by weight. In another alternate embodiment, LUPEROX® 101 may be used in concentrations of from about 50 to about 500 ppm by weight.

The modified polymer resin may be used to make various test pieces or other articles. In an embodiment, the polymer resin or modified polymer resin may be tested for melt flow rate and may be injection molded into test plaques or test bars to perform various other tests including, but not limited to, IZOD impact, Gardner impact, Dynatup impact, flexural modulus, and tensile tests. In an embodiment, a modified polymer resin with excellent ductile properties may be produced.

In particular, Dynatup impact testing may be performed according to various standards. For example, the test may be performed according to ASTM D3763 or according to ISO 6603. For purposes of this disclosure, reference to the Dynatup impact test will be a reference to the test method described in ASTM D-3763. The Dynatup Impact test can be used to determine the toughness or impact resistance of a plastic material. In this test, a specimen is placed in a Dynatup impact test tower. The specimens are generally 4 inch by 4 inch plaques or 4 inch diameter disks, although actual molded materials may also be tested. A device known as a "tup" is raised to an appropriate height above the specimen and then released at a specified velocity generated by air pressure. The tup comprises an impact head and a load cell that can measure and electronically record data related to the impact of the tup on the specimen and the toughness of the specimen. From the moment the tup starts moving downward to the moment of impact, the Dynatup device's high-speed data acquisition system measures a variety of variables, such as total energy, maximum load, maximum force, energy at maximum force, and total energy to break. Since the tup can be released at various velocities, the speed of the tup upon impact with the specimen can be varied as desired.

Many materials exhibit lower impact resistance at reduced temperatures so it is sometimes appropriate to test materials at temperatures that simulate the intended end-use environment. Testing at reduced temperatures was conducted with the test apparatus in an enclosed refrigerated chamber.

Embodiments of the present invention have particularly beneficial properties at low temperatures. For example, a modified polymer resin capable of sustaining a maximum load of equal to or greater than about 1,700 N, alternatively equal to or greater than about 2,000 N, alternatively equal to or greater than about 2,500 N, alternatively equal to or greater than about 3,000 N, alternatively equal to or greater than about 3,500 N at a temperature of greater than or equal to about −40° C. and a test velocity of 6 m/s is possible with embodiments of the present invention. Further, a modified polymer resin capable of sustaining a maximum load of equal to or greater than about 2,300 N, alternatively equal to or greater than about 2,500 N, alternatively equal to or greater than about 3,000 N, alternatively equal to or greater than about 3,500 N, alternatively equal to or greater than about 4,000 N, at a temperature of greater than or equal to about −40° C. and a test velocity of 8.5 m/s is possible.

In addition, a modified polymer resin capable of absorbing a total energy of greater then 28 J, altenatively equal to or greater than about 30 J, alternatively equal to or greater than about 35 J, alternatively equal to or greater than about 40 J, alternatively equal to or greater than about 45 J, at a temperature of greater than or equal to about −30° C. and a test velocity of 6 m/s is possible with embodiments of the present invention. Further, a modified polymer resine capable of absorbing a total energy of equal to or greater than about 7 J, alternatively equal to or greater than about 10 J, alternatively equal to or greater than about 15 J, alternatively equal to or greater than about 20 J, alternatively equal to or greater than about 22 J, at a temperature greater than or equal to about −40° C. and a test velocity of 6 m/s is possible with embodiments of the present invention.

In addition, a modified polymer resin capable of absorbing a total energy of greater than about 30 J, alternatively equal to or greater than about 35 J, alternatively equal to or greater than about 40 J, alternatively equal to or greater than about 43 J, at a temperature of greater than or equal to about −30° C. and a test velocity of 8.5 m/s is possible with embodiments of the present invention. Further, a modified polymer resin capable of absorbing a total energy of greater than about 11 J, alternatively equal to or greater than about 15 J, alternatively equal to or greater than about 20 J, alternatively equal to or greater than about 25 J, alternatively equal to or greater than about 30 J, alternatively equal to or greater than about 34 J, at a temperature of greater than or equal to about −40° C. and a test velocity of 8.5 m/s is possible with embodiments of the present invention.

Another important test for determining the usefulness of polymer resins is the flexural modulus test. Flexural modulus may be measured according to ASTM D790 or ISO 178. For purposes of this disclosure, reference to the flexural modulus test will be a reference to the test method described in ASTM D-790. The flexural modulus test in broad terms measures the force required to bend a sample material beam. The force is applied to the center of the sample beam, while the beam is supported on both ends. As with the Dynatup impact test, many materials exhibit different characteristics at different temperatures, so it is often appropriate to test the materials at end use conditions. The test may be conducted in a temperature controlled chamber to effect testing at end use conditions. Modified polymer resins according to embodiments of the present invention combine the improved low temperature properties with good stiffness. For example, modified polymer resins with a flexural modulus (ASTM D-790) of at least about 1,000 MPa, or even at least about 1,100 MPa are possible. In an alternate embodiment, a modified polymer resin with a flexural modulus of greater than about 1,200 MPa is possible.

Melt flow rate is yet another important property for polymer resins. Melt flow rate may be determined according to ASTM D1238 (Procedure A), ASTM D3364, or ISO 1133. For purposes of this disclosure, reference to melt flow rate will be a reference to the test method described in ASTM D-1238. As discussed above, melt flow rate indicates the quantity of a melted polymer resin that will flow through an orifice at a specified temperature and under a specified load. Also as discussed above, melt flow rate refers to test method ASTM D-1238 at 230° C. and under a load of 2.16 kg. Modified polymer resins according to embodiments of the present invention may have melt flow rates of at least about 15, alternatively at least about 20, alternatively at least about 25, and alternatively at least about 30 g/10 min.

Modified polymer resins of the present invention possessing the aforementioned properties may be used to produce a variety of end use products. For example, automobile parts, including, but not limited to, automobile dashboards, interior trim moldings. may be produced with modified polymer resins of the current invention. Further, other products such as toys, sporting goods, safety products, containers, or most other products that may be produced from a polymer may be produced with modified polymer resins of the present invention, or even with unmodified polymer resins of the present invention. The modified polymer resins produced according to an embodiment of the present invention are particularly suited to uses requiring low-temperature impact resistance combined with stiffness and ample melt flow. Thus, automobile interior components, such as dashboards and interior trim moldings, are particularly suitable applications for embodiments of the present invention. Nevertheless, other uses requiring the combination of benefits described are equally suitable for embodiments of the present invention. Such end use products are generally made by injection molding. Various components may be made by injection of modified polymer resin according to an embodiment of the present invention into molds conforming to the shape of the article to be manufactured.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

Three different modified polymer resins were produced by using differing amounts of peroxide to raise the melt flow rate. A sample of the commercially available impact-copolymer polypropylene resin fluff described previously at the 5720 resin was modified using various quantities of additives. The following additives were added to the 5720 resin fluff: 0.05 wt. % IRGANOX 1010, 0.05 wt. % IRGAFOS 168, 0.05 wt. % calcium state, and LUPEROX 101 at 50 ppm by weight in modified resin 1, 60 ppm by weight in modified resin 2, and 75 ppm by weight in modified resin 3. The four polymer resins were extruded and pelletized at about 250° C. on a 2.5 inch Welex extruder containing a 30:1 L/D screw and operating at 150 rpm with a 100 mesh screen pack. The resulting properties of the three modified polymer resins that were produced, along with the unmodified polymer resin, are shown in Table 1 below. Appropriate test articles such as ⅛ in. plaques, and test bars were prepared as needed in accordance with a specific testing protocol.

TABLE 2

| Property | Test Method | 5720 Resin | Modified Resin 1 | Modified Resin 2 | Modified Resin 3 |
| --- | --- | --- | --- | --- | --- |
| COLOR | | Control | | | |
| Color L | | 86.3 | 85.8 | 85.8 | 8539 |
| Color a | | −1.03 | −2.64 | −2.67 | −2.56 |
| Color b | | 0.17 | 2.25 | 2.24 | 2.08 |
| YI (D1925) | | −−1.2 | 2.5 | 2.4 | 2.2 |
| GARDNER | | | | | |
| Mean Failure Wt. (in/lb) | | 195 | 186.4 | 183.2 | 188.0 |
| INSTRUM IMPACT | ASTM D-3763 | | | | |
| Impact Velocity (ft/s) | | 27.9 | 27.9 | 28.0 | 28.0 |
| Impact Energy (ft-lb) | | 87.6 | 87.8 | 88.2 | 88.2 |
| Maximum Load (lbf) | | 735. | 737 | 726. | 729. |
| Maximum Load (N) | | 3270 | 3280 | 3230 | 3240 |
| Energy to Max Load (ft-lb) | | 20.5 | 20.9 | 19.3 | 19.6 |
| Energy After Mx Ld (ft-lb) | | 7.8 | 11.4 | 10.0 | 10.1 |
| Total Energy (ft-lb) | | 28.3 | 32.3 | 29.3 | 29.7 |
| Total Energy (J) | | 38.3 | 43.8 | 39.8 | 40.2 |
| Temperature (° F.) | | 32 | 32 | 32 | 32 |
| IZOD | ASTM D-256 | | | | |
| Izod Impact-Notch (ft-lb/in) | | 2.2 | 2.1 | 2.2 | 2.2 |
| Izod Impact-Notch (J/m) | | 117 | 112 | 117 | 117 |
| Break Type-Notched | | Complete Break | Complete Break | Complete Break | Complete Break |
| Test temperature (C.) | | 23 | 23 | 23 | 23 |
| MELT FLOW | ASTM D-1238 | | | | |
| Melt Flow Rate (g/10 min) | | 21 | 26 | 28 | 29 |
| PP FLEX INSTRON | ASTM D-790 | | | | |
| 2% Flexural Modulus (PSI) | | 145,200 | 140,400 | 139,2006 | 135,700 |
| 1% Flexural Modulus (PSI) | | 167,500 | 161,200 | 159,00 | 155,300 |
| 0.4% Flexural Mod (PSI) | | 175,400 | 168,600 | 166,700 | 161,900 |
| Flex Modulus (Chord 4-8N) | | 175,200 | 169,400 | 168,800 | 162,400 |
| Flex Modulus (MPa) | | 1210 | 1170 | 1160 | 1120 |
| PP TENSILE BARS | ASTM D-638 | | | | |
| Tensile Modulus (PSI) | | 172,900 | 172,800 | 173,400 | 163,700 |
| Tens. Strength - Yield (PSI) | | 3380 | 3400 | 3390 | 3270 |
| Tens. Strength - Yield (MPa) | | 23.3 | 23.4 | 23.3 | 22.5 |
| Tens. Strength - Break (PSI) | | 2210 | 2210 | 2230 | 1560 |
| Elongation at Yield (%) | | 8.8 | 8.9 | 9.1 | 9.2 |
| Elongation at Break (%) | | 43 | 37 | 45 | 41 |

As Table 2 indicates, substantial increases in melt flow rate are possible without significantly affecting the strength, stiffness, or impact resistance of the modified polymer resin. For example, as the melt flow rate is increased from 21 g/10 min. to 29 g/10 min., the flexural modulus only decreases from 175,200 psi to 162,400 psi. Further, with the same increase in melt flow rate, the total energy absorbed under an instrument impact test improved from 38.3 J to a low of 39.8 J. Thus, in an embodiment of the present invention, the combination of stiffness, impact resistance, and high melt flow rate may be achieved.

Example 2

The sample modified polymer resin for Example 2 was prepared from ATOFINA 5720 pellets comprising approximately 0.05 wt. % of IRGANOX 1010, approximately 0.05 wt. % of IRGAFOS 168, and approximately 0.05 wt. % of calcium stearate. The pelletized polymer resin was combined with 0.045 wt. % LUPEROX® 101PP20 powder peroxide to modify the polymer resin extruded and pelletized at about 250° C. on a 2.5 inch Welex extruder containing a 24:1 L/D screw and operating at 100 rpm with a 200-mesh screen pack.

To demonstrate the low temperature impact resistance that is possible with the present invention, an embodiment of the present invention was compared to two conventional commercially available products. For comparison, common properties of the three samples are shown in Table 3 below.

Figure 2:
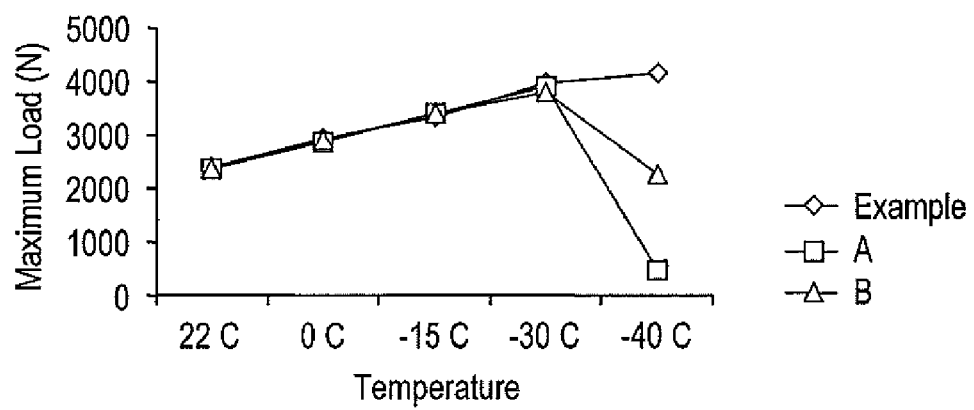

FIG. 1 indicates the maximum load under the instrument impact (Dynatup) test (ASTM D-3763) for three samples at a velocity of 6 m/s. As the temperature decreases to −40° C., the improved low temperature strength of the material becomes obvious. The embodiment of the present invention is represented as "Example" in the figure and shows a maximum load of well over 3,500 N at −40° C. The commercially available materials A and B were both only able to sustain maximum loads well below 2,000 N. At a velocity of 8.5 m/s, the "Example" in the FIG. 2 shows a maximum load of over 4000 N at −40° C. The commercially available materials A and B were both only able to sustain maximum loads below 2500 N. Similarly, FIGS. 3 and 4 show the total energy absorbed in the instrument impact (Dynatup) test (ASTM D-3763) for samples at velocities of 6 and 8.5 m/s, respectively. FIGS. 3 and 4 show that as the temperature drops, the embodiment of the present invention (Example) absorbs far more energy than the comparable commercially available materials A and B. At a velocity of 6 m/s the embodiment of the present invention absorbed greater than 45 J of energy at −30° C. while the comparable resins A and B absorbed less than about 30 J. At −40° C., the embodiment of the present invention (Example) absorbed greater than 20 J, while the comparable resins A and B absorbed less than about 8 J. At a velocity of 8.5 m/s the embodiment of the present invention (Example) absorbed greater than 40 J of energy at −30° C. while the comparable resins A and B absorbed about 30 J. At −40° C., the embodiment of the present invention (Example) absorbed

TABLE 3

| Property | Test Method | Control Resin Example | Resin A | Resin B |
|---|---|---|---|---|
| MELT FLOW | | | | |
| Melt Flow Rate (g/10 min.) | ASTM D-1238 | 23 | 26 | 10 |
| IMPACT | | | | |
| Notched Izod (ft. lb/in) | ASTM D-256 | 2.6 | 11 | 8.2 |
| Notched Izod (J/m) | ASTM D-256 | 139 | 587 | 437 |
| Notched Izod (kJ/m2) | ISO 180 | 12.9 | 12.4 | 40.8 |
| Gardner (in/lb.) | | 200 | 201 | 220 |
| Gardner (J) | | 23 | 23 | 25 |
| FLEXURAL PROPERTIES | | | | |
| Modulus (psi) | ASTM D-790 | 162,000 | 161,000 | 158,000 |
| Modulus (MPa) | ASTM D-790 | 1,120 | 1,110 | 1,090 |
| Modulus (MPa) | ISO 178 | 1,180 | 1,330 | 1,150 |
| TENSILE PROPERTIES | | | | |
| Strength at Yield (psi) | ASTM D-638 | 3,190 | 3,310 | 3,170 |
| Strength at Yield (MPa) | ASTM D-638 | 22 | 23 | 22 |
| Strength at Yield (MPa) | ISO 527 | 22.1 | 24.0 | 21.5 |
| Elongation at Yield (%) | ASTM D-638 | 9 | 14 | 10 |
| Elongation at Yield (%) | ISO 527 | | | |
| Elongation at Break (%) | ASTM D-638 | 83 | 157 | 90 |
| Elongation at Break (%) | ISO 527 | | | |
| Modulus (psi) | ASTM D-638 | 168,000 | 171,000 | 157,000 |
| Modulus (MPa) | ASTM D-638 | 1,160 | 1,180 | 1,180 |
| HEAT DEFLECTION TEMPERATURE | | | | |
| 0.45 Mpa Load, © | ISO 75 | 84 | 86 | 72 |
| COLOR | | | | |
| Yellowness Index | | 3.8 | −1.9 | 0.2 |
| GLOSS | | | | |
| Percent at 45 Degrees | | 19 | 46 | 16 | greater than 30 J, while the comparable resins A and B absorbed less than about 12 J. Thus, the improved low temperature impact resistance is evident. The data graphed in FIGS. 1 through 4 is provided in Table 4.

TABLE 4

| Instrumented Impact | Control Resin Example | | Resin A | | Resin B | |
|---|---|---|---|---|---|---|
| Maximum Load at 6 m/s | lbf | N | lbf | N | lbf | N |
| 22 C. | 523 | 2326 | 514 | 2286 | 513 | 2282 |
| 0 C. | 630 | 2802 | 630 | 2802 | 640 | 2847 |
| −15 C. | 757 | 3367 | 746 | 3318 | 747 | 3323 |
| −30 C. | 821 | 3652 | 835 | 3714 | 825 | 3670 |
| −40 C. | 864 | 3843 | 141 | 627 | 378 | 1681 |
| Maximum Load at 8.5 m/s | lbf | N | lbf | N | lbf | N |
| 22 C. | 536 | 2384 | 530 | 2357 | 529 | 2353 |
| 0 C. | 659 | 2931 | 645 | 2869 | 651 | 2896 |
| −15 C. | 748 | 3327 | 760 | 3380 | 761 | 3385 |
| −30 C. | 890 | 3959 | 876 | 3896 | 849 | 3776 |
| −40 C. | 935 | 4159 | 108 | 480 | 505 | 2246 |
| Total Energy at 6 m/s | ft. lb | J | ft. lb | J | ft. lb | J |
| 22 C. | 26 | 35 | 26 | 35 | 26 | 35 |
| 0 C. | 29 | 39 | 29 | 39 | 30 | 41 |
| −15 C. | 34 | 46 | 32 | 43 | 33 | 45 |
| −30 C. | 35 | 47 | 21 | 28 | 20 | 27 |
| −40 C. | 16 | 22 | 1.9 | 2.6 | 4.8 | 6.6 |
| Total energy at 8.5 m/s | ft. lb | J | ft. lb | J | ft. lb | J |
| 22 C. | 27 | 37 | 25 | 34 | 27 | 37 |
| 0 C. | 30 | 41 | 29 | 39 | 29 | 39 |
| −15 C. | 32 | 43 | 32 | 43 | 33 | 45 |
| −30 C. | 32 | 43 | 22 | 30 | 21 | 28 |
| −40 C. | 25 | 34 | 2 | 2.7 | 7.9 | 11 |

While embodiments and examples of the invention have been shown and described, modifications thereof can be made by one skilled in the art without departing from the teachings of the invention. Reactor design criteria, pendant polymer processing equipment, and the like for any given implementation of the invention will be readily ascertainable to one of skill in the art based upon the disclosure herein. The embodiments and examples described herein are provided for illustration and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. An ethylene-propylene impact copolymer having the following physical properties:
   a flexural modulus (ASTM D-790) of at least 1,100 MPa;
   a melt flow rate (ASTM D-1238) of at least 25 g/10 mm; and
   a maximum load under Dynatup Impact test (ASTM D-3763) of equal to or greater than 1,700 N at a temperature of greater than or equal to about −40° C.

2. The impact copolymer of claim 1 wherein the Dynatup Impact test is performed at a velocity of 6 m/s.

3. The impact copolymer of claim 1 wherein the Dynatup Impact test is performed at a velocity of 8.5 m/s.

4. The impact copolymer of claim 2 wherein the maximum load under Dynatup Impact test is equal to or greater than about 3,500 N at a temperature of greater than or equal to about −30° C.

5. The impact copolymer of claim 3 wherein the maximum load under Dynatup Impact test is equal to or greater than about 2,300 N at a temperature of greater than or equal to about −40° C.

6. The impact copolymer of claim 3 wherein the maximum load under Dynatup Impact test is equal to or greater than about 4,000 N at a temperature of greater than or equal to about −30° C.

7. The impact copolymer of claim 2 wherein the total energy absorbed under Dynatup Impact test is greater than about 45 J at a temperature of equal to or greater than about −15° C.

8. The impact copolymer of claim 2 wherein the total energy absorbed under Dynatup Impact test is greater than about 28 J at a temperature of greater than or equal to about −30° C.

9. The impact copolymer of claim 2 wherein the total energy absorbed under Dynatup Impact test is equal to or greater than about 45 1 at a temperature of greater than or equal to about −30° C.

10. The impact copolymer of claim 2 wherein the total energy absorbed under Dynatup Impact test is equal to or greater than about 7 J at a temperature of greater than or equal to about −40° C.

11. The impact copolymer of claim 2 wherein the total energy absorbed under Dynatup Impact test is equal to or greater than about 22 J at a temperature of greater than or equal to about −40° C.

12. The impact copolymer of claim 3 wherein the total energy absorbed under Dynatup Impact test is greater than about 43 J at a temperature of greater than about −15° C.

13. The impact copolymer of claim 3 wherein the total energy absorbed under Dynatup Impact test is greater than about 30 J at a temperature greater than or equal to about −30° C.

14. The impact copolymer of claim 3 wherein the total energy absorbed under Dynatup Impact test is equal to or greater than about 43 J at a temperature greater than or equal to about −30° C.

15. The impact copolymer of claim 3 wherein the total energy absorbed under Dynatup Impact test is greater than about 11 J at a temperature greater than or equal to about −40° C.

16. The impact copolymer of claim 3 wherein the total energy absorbed under Dynatup Impact test is equal to or greater than about 34 J at a temperature greater than or equal to about −40° C.

17. The impact copolymer of claim 1 wherein the impact copolymer comprises about 5% to about 25% ethylene by weight.

18. The impact copolymer of claim 1 wherein the impact copolymer comprises about 10% to about 12% ethylene by weight.

19. An article of manufacture comprising the impact copolymer of claim 1.

20. The article of manufacture of claim 19 wherein the article of manufacture comprises automobile interior trim components.

21. The article of manufacture of claim 19 wherein the article of manufacture comprises an automobile dashboard.

22. An impact copolymer comprising the following physical properties:
   a flexural modulus (ASTM D-790) of at least 1,100 MPa;

a melt flow rate (ASTM D-1238) of at least 25 g/10 mm; and a total energy absorbed under Dynatup Impact test (ASTM D-3763) of greater than about 28 J at a temperature greater than or equal to about −30° C. at a test velocity of 6 m/s.

23. An impact copolymer comprising the following physical properties:

a flexural modulus (ASTM D-790) of at least 1,100 MPa;

a melt flow rate (ASTM D-1238) of at least 25 g/10 mm; and a total energy absorbed under Dynatup Impact test (ASTM D-3763) of greater than about 30 J at a temperature greater than or equal to about −30° C. at a test velocity of 8.5 m/s.

* * * * *